(12) United States Patent
Adusumilli et al.

(10) Patent No.: US 6,701,405 B1
(45) Date of Patent: Mar. 2, 2004

(54) DMA HANDSHAKE PROTOCOL

(75) Inventors: Vijaya Pratap Adusumilli, San Jose, CA (US); Bernard Ramanadin, San Jose, CA (US); Atsushi Hasegawa, Sunnyvale, CA (US); Shinichi Yoshioka, San Jose, CA (US); Takanobu Naruse, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,927

(22) Filed: Oct. 1, 1999

(51) Int. Cl.[7] .............. G06F 13/36; G06F 13/28
(52) U.S. Cl. .............. 710/308; 710/22; 710/26; 710/306
(58) Field of Search .............. 710/308, 310, 710/22, 26

(56) References Cited

U.S. PATENT DOCUMENTS

| | | | |
|---|---|---|---|
| 4,814,981 A | 3/1989 | Rubinfeld | |
| 5,251,311 A | 10/1993 | Kasai | |
| 5,386,565 A | 1/1995 | Tanaka et al. | |
| 5,423,050 A | 6/1995 | Taylor et al. | |
| 5,434,804 A | 7/1995 | Bock et al. | |

(List continued on next page.)

FOREIGN PATENT DOCUMENTS

| | | | |
|---|---|---|---|
| EP | 0165600 B | 11/1991 | |
| EP | 0636976 B | 2/1995 | |
| EP | 0652516 A | 5/1995 | |
| EP | 0702239 A | 3/1996 | |
| EP | 0720092 A | 7/1996 | |
| EP | 0933926 A | 8/1999 | |
| EP | 0945805 A | 9/1999 | |
| EP | 0959411 A | 11/1999 | |
| JP | 8320796 A | 12/1996 | |
| JP | 8329687 A | 12/1996 | |
| JP | 9212358 A | 8/1997 | |
| JP | 9311786 A | 12/1997 | |
| JP | 10106269 A | 4/1998 | |
| JP | 10124484 A | 5/1998 | |
| JP | 10177520 A | 6/1998 | |
| SG | 55356 | 7/1997 | |
| WO | WO 98/13759 A | 4/1998 | |

OTHER PUBLICATIONS

York et al. "Real Time Debug for System–on–Chip Devices," ARM Ltd., Cambridge, UK available from http://www.arm.com (1999).

*Primary Examiner*—Tim Vo
(74) *Attorney, Agent, or Firm*—Townsend and Townsend and Crew LLP

(57) ABSTRACT

A computer system having a simple handshake protocol for implementing DMA transfers. A system bus is provided having a plurality of ports for coupling to system components including memory, central processing unit(s) and peripherals. A direct memory access controller (DMAC) is provided with a peripheral-independent interface coupled to the system bus and communicates with the system bus using system bus defined transactions. The DMAC comprises a set of registers. A central processing unit (CPU) configures teh DMAC by loading values into the DMAC registers. The configured DMAC issues an enable signal to a selected system component identified in the DMAC registers. A peripheral request interface is associated with the selected system components and communicates with the system bus using the system bus defined transactions. The selected system component asserts a request signal to the DMAC. In response to the request signal, the DMAC implements a DMA transfer according to the values stored in the DMAC configuration registers. Peripheral-specific signaling is provided to the system component by the peripheral request interface

14 Claims, 5 Drawing Sheets

U.S. PATENT DOCUMENTS

| | | |
|---|---|---|
| 5,440,705 A | 8/1995 | Wang et al. |
| 5,448,576 A | 9/1995 | Russell |
| 5,452,432 A | 9/1995 | Macachor |
| 5,455,936 A | 10/1995 | Maemura |
| 5,479,652 A | 12/1995 | Dreyer et al. |
| 5,483,518 A | 1/1996 | Whetsel |
| 5,485,624 A * | 1/1996 | Steinmetz et al. ............ 710/22 |
| 5,488,688 A | 1/1996 | Gonzales et al. |
| 5,530,965 A | 6/1996 | Kawasaki et al. |
| 5,570,375 A | 10/1996 | Tsai et al. |
| 5,590,354 A | 12/1996 | Klapproth et al. |
| 5,596,734 A | 1/1997 | Ferra |
| 5,598,551 A | 1/1997 | Barajas et al. |
| 5,608,881 A | 3/1997 | Masumura et al. |
| 5,613,153 A | 3/1997 | Arimilli et al. |
| 5,613,162 A * | 3/1997 | Kabenjian .................... 710/22 |
| 5,627,842 A | 5/1997 | Brown et al. |
| 5,657,273 A | 8/1997 | Ayukawa et al. |
| 5,659,798 A * | 8/1997 | Blumrich et al. ............. 710/26 |
| 5,682,545 A | 10/1997 | Kawasaki et al. |
| 5,704,034 A | 12/1997 | Circello |
| 5,708,773 A | 1/1998 | Jeppesen, III et al. |
| 5,724,549 A | 3/1998 | Selgas et al. |
| 5,737,516 A | 4/1998 | Circello et al. |
| 5,751,621 A | 5/1998 | Arakawa |
| 5,768,152 A | 6/1998 | Battaline et al. |
| 5,771,240 A | 6/1998 | Tobin et al. |
| 5,774,701 A | 6/1998 | Matsui et al. |
| 5,778,237 A | 7/1998 | Yamamoto et al. |
| 5,781,558 A | 7/1998 | Inglis et al. |
| 5,796,978 A | 8/1998 | Yoshioka et al. |
| 5,828,825 A | 10/1998 | Eskandari et al. |
| 5,832,248 A | 11/1998 | Kishi et al. |
| 5,835,963 A | 11/1998 | Yoshioka et al. |
| 5,838,993 A * | 11/1998 | Riley et al. ................... 710/22 |
| 5,848,247 A | 12/1998 | Matsui et al. |
| 5,860,127 A | 1/1999 | Shimazaki et al. |
| 5,862,387 A | 1/1999 | Songer et al. |
| 5,867,726 A | 2/1999 | Ohsuga et al. |
| 5,884,092 A | 3/1999 | Kiuchi et al. |
| 5,896,550 A | 4/1999 | Wehunt et al. |
| 5,918,045 A | 6/1999 | Nishii et al. |
| 5,930,523 A | 7/1999 | Kawasaki et al. |
| 5,930,833 A | 7/1999 | Yoshioka et al. |
| 5,933,654 A * | 8/1999 | Galdun et al. ................ 710/22 |
| 5,944,841 A | 8/1999 | Christie |
| 5,950,012 A | 9/1999 | Shiell et al. |
| 5,953,538 A | 9/1999 | Duncan et al. |
| 5,956,477 A | 9/1999 | Ranson et al. |
| 5,978,874 A | 11/1999 | Singhal et al. |
| 5,978,902 A | 11/1999 | Mann |
| 5,983,017 A | 11/1999 | Kerr et al. |
| 5,983,379 A | 11/1999 | Warren |
| 6,000,043 A * | 12/1999 | Abramson .................... 714/44 |
| 6,111,592 A * | 8/2000 | Yagi ........................... 345/511 |
| 6,185,634 B1 * | 2/2001 | Wilcox ........................ 710/26 |
| 6,219,725 B1 * | 4/2001 | Diehl et al. ................... 710/26 |
| 6,415,338 B1 * | 7/2002 | Habot ......................... 710/22 |

* cited by examiner

| REGISTER NAME | DESCRIPTION | OFFSET ADDRESS |
| --- | --- | --- |
| DMA.VCR | VERSION CONTROL | 0X00 |
| DMA.COMMON | DMA OPERATION | 0X08 |
| DMA.SAR | SOURCE ADDRESS | 0X10 + (0X28*N) |
| DMA.DAR | DESTINATION ADDRESS | 0X18 + (0X28*N) |
| DMA.COUNT | TRANSFER COUNT | 0X20 + (0X28*N) |
| DMA.CTRL | CONTROL REGISTER | 0X28 + (0X28*N) |
| DMA.STATUS | STATUS REGISTER | 0X30 + (0X28*N) |

*FIG. 4*

| perr_flags | merr_flags | mod_vers | mod_id | bot_mb | top_mb |

| priority | int_status | enable |

| mod_vers | mod_id | bot_mb | top_mb |

| transfer.end | address.error |

| transfer.size | source.increment | dest.increment | resource.select | interrupt.enable | transfer.enable |

DMA HANDSHAKE PROTOCOL

BACKGROUND OF THE INVENTION

1. Field of the Invention

The present invention relates in general to microprocessor systems and, more particularly, to a system, method, and mechanism providing direct memory access (DMA) between system components and memory without imposing on the processor.

2. Relevant Background

Conventional computer architectures facilitate data movement between input/output (I/O) devices and system memory by providing a hardware mechanism that implements Direct Memory Access (DMA). DMA transfer allows data to be read from an I/O device and written to a designated location in memory, or read from a designated location in memory and written to an I/O device without involvement by a central processing unit (CPU). This functionality takes advantage of the fact that hardware controlled system data transfers are often faster than transfers involving the CPU. Also, the CPU is free to perform other useful work while the DMA transfer takes place. Direct memory access (DMA) is a way for computer peripheral devices to communicate with working memory without involving the CPU. DMA is a very fast way of transferring blocks of data when no processing is required and is a conventional method by which hard disks, soundboards and data acquisition equipment send and receive data to and from memory.

A DMA transfer can be initiated by a peripheral or the central processing unit (CPU) itself. A DMA controller coupled to system bus actually manages DMA transfers. The system bus is coupled directly or indirectly to the CPU, peripherals, and the main memory. Most DMA systems provide multiple DMA "channels," wherein each DMA channel is assigned to a particular I/O device.

Current DMA implementations involve a DMA controller that is closely coupled to the peripherals and system bus. By closely coupled it is meant that a relatively complex interface exists between peripherals using DMA and the DMA controller. This interface enables the peripheral and DMA controller to exchange state information to make the DMA exchange take place and cause the DMAC to issue a DMA transfer acknowledge. Usually this interface must be implemented with a large number of signal wires to handle tasks of initiating, synchronizing, and performing DMA transfers.

These types of implementations are difficult to scale to large numbers of peripherals. The number of signal lines required to implement the complex interface increases with the number of peripherals. The length and complexity of signal lines-becomes restrictive to large system-on-a-chip designs. Moreover, the complex interface imposes a significant overhead in terms of signaling hardware on the peripherals that use DMA. A need exists for a processor implementing DMA and a DMA implementation method with reduced hardware overhead that is readily scaleable and readily implemented in DMA peripherals.

Another limitation of many DMA implementations is that the close coupling of the DMAC with the peripherals makes it difficult to reuse the circuit designs in other implementations. Design reuse is an increasingly important criteria, especially in embedded system design. A need exists for a mechanism and method for coupling DMA components to implement DMA transfers using a general purpose system bus for communication between the components.

SUMMARY OF THE INVENTION

The present invention involves a computer system having a simple handshake protocol for implementing DMA transfers. A system bus is provided having a plurality of ports for coupling to system components including memory, central processing unit(s) and peripherals. A direct memory access controller (DMAC) is provided with a peripheral-independent interface coupled to the system bus and communicates with the system bus using system bus defined transactions. The DMAC comprises a set of registers. A central processing unit (CPU) configures teh DMAC by loading values into the DMAC registers. The configured DMAC issues an enable signal to a selected system component identified in the DMAC registers. A peripheral request interface is associated with the selected system components and communicates with the system bus using the system bus defined transactions. The selected system component asserts a request signal to the DMAC. In response to the request signal, the DMAC implements a DMA transfer according to the values stored in the DMAC configuration registers. Peripheral-specific signaling is provided to the system component by the peripheral request interface.

To conduct the DMA transfer the DMAC initiates a LOAD transaction request with a source peripheral specified in DMAC registers. The LOAD transaction is associated with a DMA acknowledge. The peripheral request interface responds to the LOAD transaction request and the DMA acknowledge by initiating peripheral-specific signaling to access data specified by the LOAD request. The peripheral request interface completes the LOAD transaction by supplying a LOAD response to the DMAC over the system bus. The DMAC receives and buffers the LOAD response and initiates a STORE transaction request to transfer the specified data to a destination system component specified by the DMAC registers.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 4 shows a flow diagram illustrating shared memory access operation in accordance with the present invention; and FIGS. 5–9 illustrate exemplary register formats used in an implementation of the present invention.

DETAILED DESCRIPTION OF THE PREFERRED EMBODIMENTS

The preferred implementation of the present invention comprises a system that may be implemented as a single integrated circuit system-on-a-chip solution or as multiple integrated circuits with varying levels of integration. In either case, sub-components of the system are interconnected by a bus network that may comprise one or more types of bus technologies. The bus network implements a transaction set comprising a plurality of defined transactions that can be communicated over the bus network. Each transaction comprises a request/response pair or a set of request/response pairs.

In the particular implementation, the transaction set includes memory transaction primitives that are combined to implement a direct memory access (DMA) protocol. One of the system components coupled to the bus network is a central processing unit (CPU). A system may include multiple CPUs coupled to the system bus. DMA and non-DMA peripherals are also coupled to the bus network. Main memory is also coupled to the bus network and can be accessed by the CPU and DMA peripherals through the bus network.

The present invention provides a DMA controller (DMAC) that has a peripheral-independent interface that couples to the system bus and communicates with the system bus using general purpose, system-bus defined transactions. Glue logic, referred to herein as a peripheral request interface, is associated with system components that support DMA transfers to decode the system bus transactions and implement peripheral-specific protocols with DMA peripherals. The present invention thus ensures that the DMAC does not require any peripheral-specific logic or interfaces. Accordingly, DMA peripherals and system components can be easily added to the system by providing the peripheral request interface necessary to communicate with the system bus.

The DMA protocol in accordance with the present invention enables a DMA controller (DMAC) to receive DMA transaction specifications from the CPU and then execute a DMA transfer according to the specifications. Significantly, the DMA transaction specifications are transferred to the DMAC using general purpose memory transactions similar to transactions used by the CPU for a wide variety of bus communication. Hence, the DMA peripherals do not require a special DMA interface with the DMAC. Similarly, the DMAC has a request interface that is independent of the periperhals so that any peripheral can support DMAC operation with the help of the glue logic implementing the peripheral request interface that provides a simple handshake between peripherals.

Figure 1:
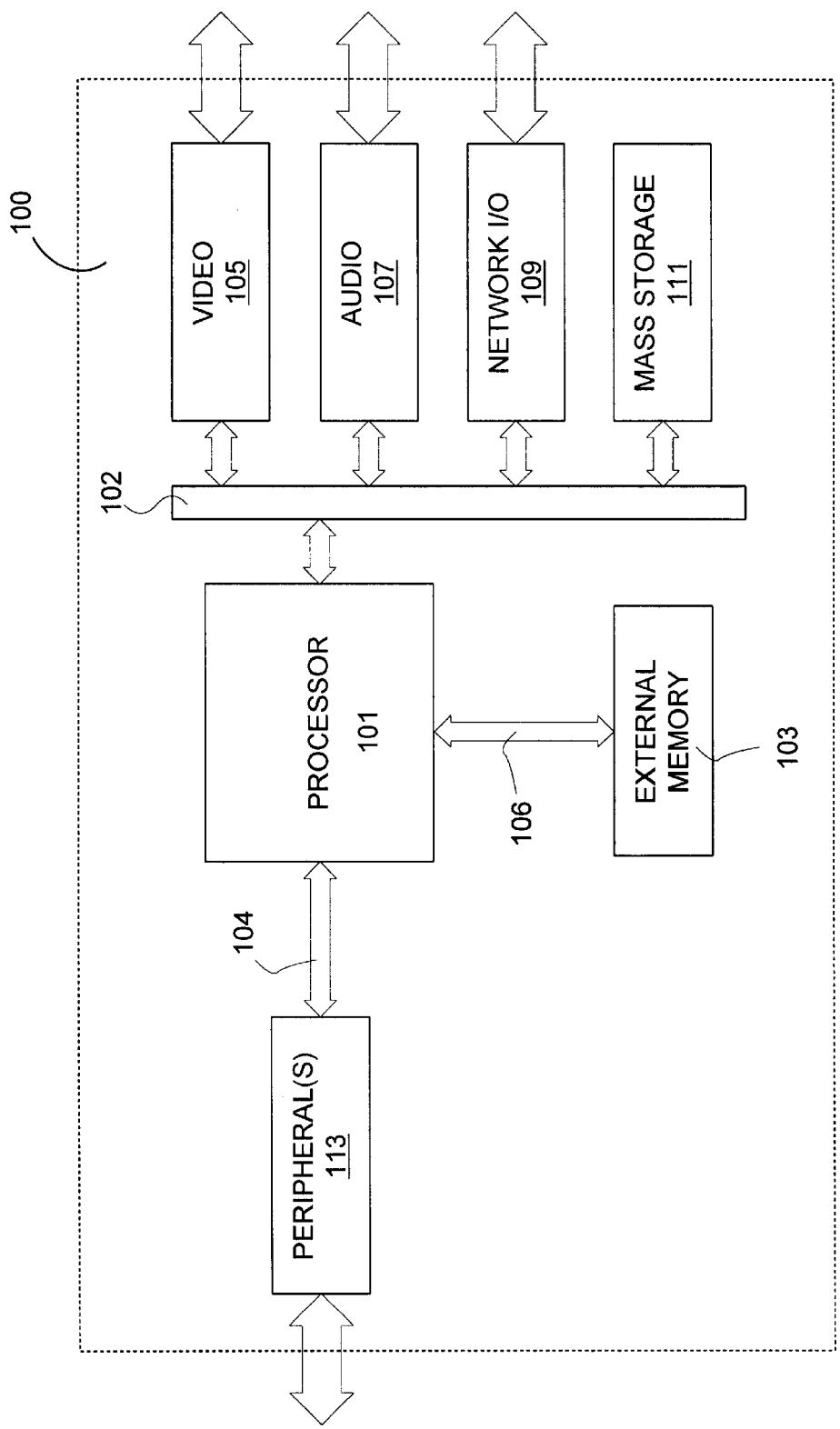
FIG. 1 shows in block diagram form a computer system incorporating an apparatus and system in accordance with the present invention.

Any system is usefully described as a collection of processes or modules communicating via data objects or messages as shown in FIG. 1. The modules may be large collections of circuitry whose properties are somewhat loosely defined, and may vary in size or composition significantly. The data object or message is a communication between modules that make up the system. To actually connect a module within the system it is necessary to define an interface between the system and the component module.

The present invention is illustrated in terms of a media system 100 shown in FIG. 1. The present invention supports systems requiring a number of components that use and benefit from direct memory access, such as media system 100. Media processor 100 comprises, for example, a "set-top box" for video processing, a video game controller, a digital video disk (DVD) player, and the like. Essentially, system 100 is a special purpose data processing system targeted at high throughput multimedia applications. Features of the present invention are embodied in processor 101 that operates to communicate and process data received through a high speed bus 102, peripheral bus 104, and memory bus 106.

Video controller 105 receives digital data from system bus 102 and generates video signals to display information on an external video monitor, television set, and the like. The generated video signals may be analog or digital. Optionally, video controller may receive analog and/or digital video signals from external devices as well. Audio controller 107 operates in a manner akin to video controller 105, but differs in that it controls audio information rather than video. Network I/O controller 109 may be a conventional network card, ISDN connection, modem, and the like for communicating digital information. Mass storage device 111 coupled to high speed bus 102 may comprise magnetic disks, tape drives, CDROM, DVD, banks of random access memory, and the like. A wide variety of random access and read only memory technologies are available and are equivalent for purposes of the present invention. Mass storage 111 may include computer programs and data stored therein.

In a particular example, high speed bus 102 is implemented as a peripheral component interconnect (PCI) industry standard bus. An advantage of using an industry standard bus is that a wide variety of expansion units such as controller's 105, 107, 109 and 111 are readily available. PCI bus 102 supports direct memory access components.

Peripherals 113 include a variety of general purpose I/O devices that may require lower bandwidth communication than provided by high speed bus 102. Typical I/O devices include read only memory (ROM) devices such as game program cartridges, serial input devices such as a mouse or joystick, keyboards, and the like. Processor 101 includes corresponding serial port(s), parallel port(s), printer ports, and external timer ports to communicate with peripherals 113. Additionally, ports may be included to support communication with on-board ROM, such as a BIOS ROM, integrated with processor 101. External memory 103 is typically required to provide working storage for processor 101 and may be implemented using dynamic or static RAM, ROM, synchronous DRAM, or any of a wide variety of equivalent devices capable of storing digital data in a manner accessible to processor 101.

Figure 2:
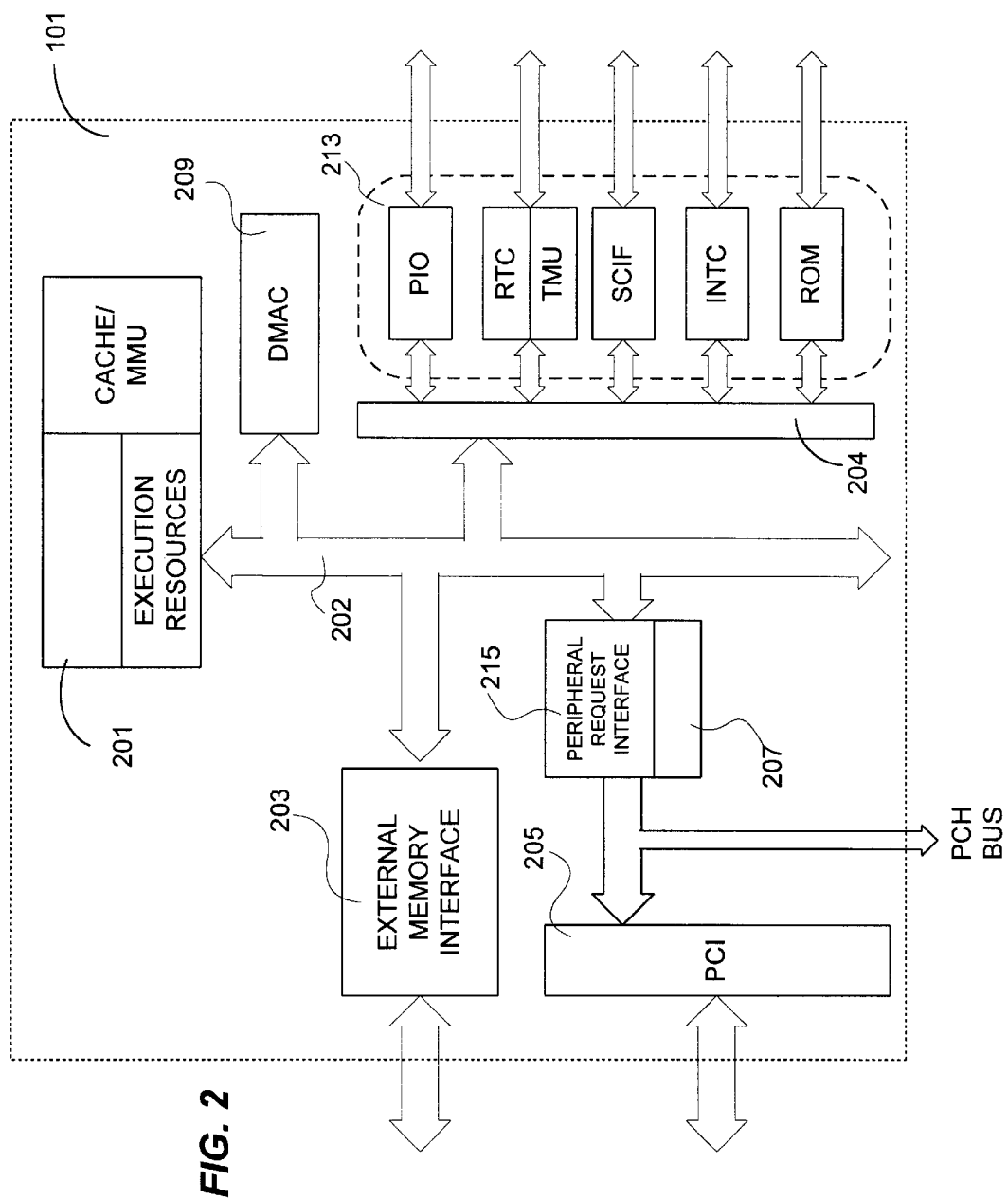
FIG. 2 shows a processor in block diagram form incorporating the apparatus and method in accordance with the present invention.

Processor 101 is illustrated in a greater detail in the functional diagram of FIG. 2. One module in a data processing system is a central processor unit (CPU) core 201. The CPU core 201 includes, among other components (not shown), execution resources (e.g., arithmetic logic units, registers, control logic) and cache memory. These functional units, discussed in greater detail below, perform the functions of fetching instructions and data from memory, preprocessing fetched instructions, scheduling instructions to be executed, executing the instructions, managing memory transactions, and interfacing with external circuitry and devices.

CPU core 201 communicates with other components shown in FIG. 2 through a system bus 202. In the preferred implementation system bus 202 is a proprietary, high-speed network bus using packet technology and is referred to herein as a "super highway". Bus 202 couples to a variety of system components. Of particular importance are components that implement interfaces with external hardware such as external memory interface unit 203, PCI bridge 207, and peripheral bus 204. Each component coupled to bus 202 may be a target of a transaction packet on bus 202 as specified by an address within the transaction packet.

External memory interface 203 provides an interface between the system bus 202 and the external main memory subsystem 103 (shown in FIG. 1). The external memory interface comprises a port to system bus 202 and a DRAM controller. Direct memory access controller (DMAC) 209 is coupled to system bus 202 and implements direct memory transfers between external memory interface 203 and any other module, including CPU 201, that specifies and initiates a DMA transfer in accordance with the present invention.

The organization of interconnects in the system illustrated in FIG. 2 is guided by the principle of optimizing each interconnect for its specific purpose. The bus system 202 interconnect facilitates the integration of several different types of sub-systems. It is used for closely coupled sub-systems which have stringent memory latency/bandwidth requirements. The peripheral subsystem 204 supports bus standards which allow easy integration of hardware of types indicated in reference to FIG. 1 through interface ports 213. PCI bridge 207 provides a standard interface that supports expansion using a variety of PCI standard devices that demand higher performance that available through peripheral port 204. The system bus 202 may be outfitted with an expansion port which supports the rapid integration of application modules without changing the other components of system 101.

Figure 3:
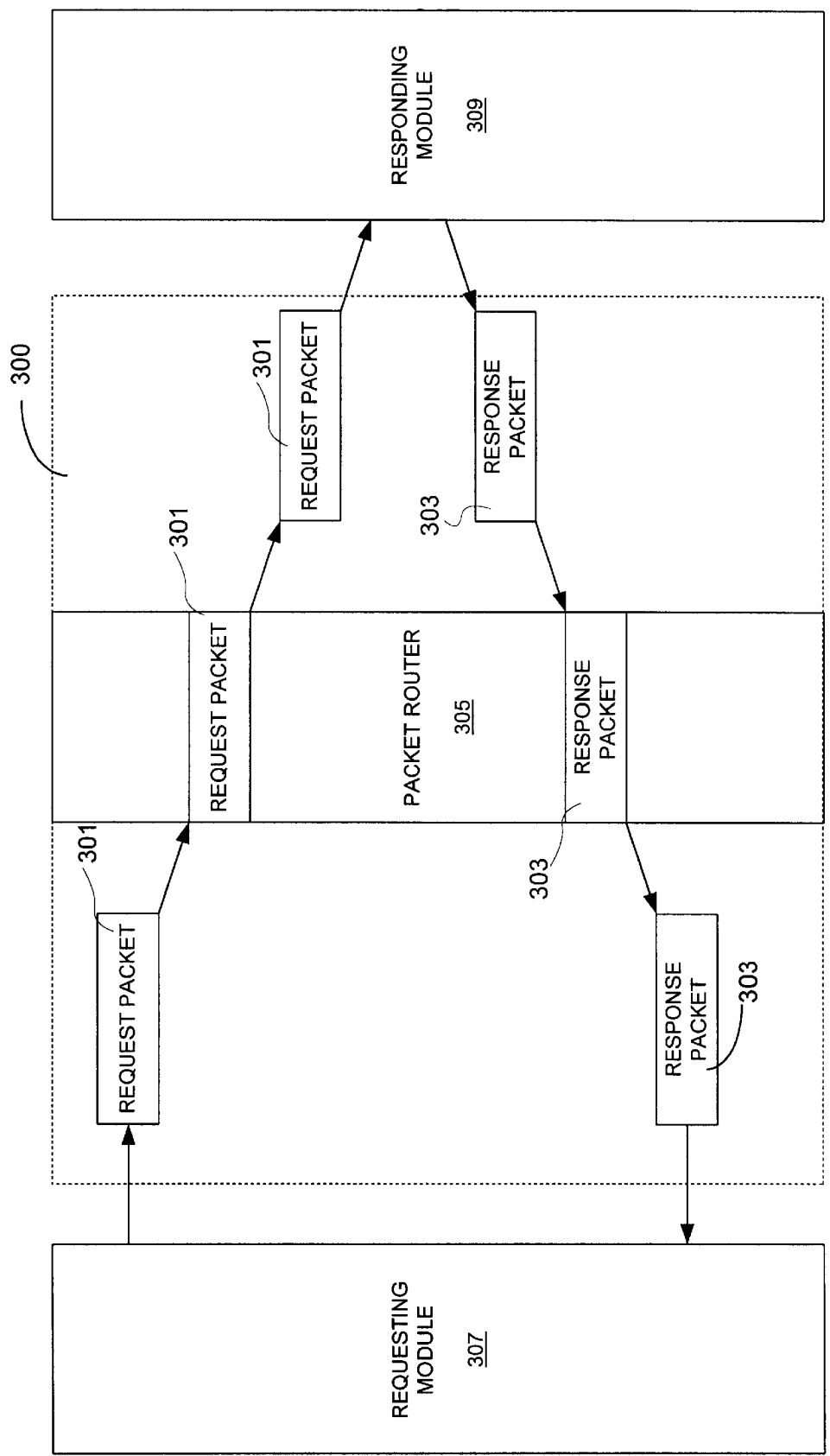
FIG. 3 illustrates a bus transaction in accordance with the present invention.

FIG. 3 illustrates an exemplary transaction 300 comprising a request packet 301 and a response packet 303 for communication across superhighway 202. Packets 301 and 303 comprise a unit of data transfer through the packet-router 305. Communication between modules 307 and 309 is achieved by the exchange of packets between those modules. Each module 307 and 307 is assigned or negotiates with packet router 305 for a unique address. In the particular example, each address is an unsigned integral value that corresponds to a location in the physical memory space of processor 201. Some of the address bits indicate the destination module and some of the address bits (called "offset bits") indicate a particular location within that destination module. The size of the physical address, the number of destination bits, and the number of offset bits are implementation dependent selected to meet the needs of a particular implementation.

Packet router 305 uses the destination bits to perform routing. Packet router 305 inspects the destination bits of a received packet, determines the appropriate port to which the packet is to be routed, and routes the packet to the specified module. Packet router 305 may be implemented as a bus, crossbar, packet routing network, or equivalent packet transport mechanism to meet the needs of a particular application.

A packet comprises a plurality of fields indicating information such as the type of transaction, destination address of the transaction, and/or data needed or produced by the transaction. Each field has a number of possible values to characterize that packet. Every packet contains a destination field which is used by packet router 305 to determine which module the packet should be routed to. In the particular implementation, every packet has a class and a type. A packet's class is either a request or a response. A response packet class is subdivided into either an ordinary response or an error response. A packet's type indicates the kind of transaction associated with that packet. The packet class and type together form a packet opcode.

Each packet is associated with a source module and a destination module. The source sends a packet 301 or 303 over a port into a packet-router 305 within bus 202. Packet-router 305 arranges for the packet to be routed to a p-port connected to the destination. The destination then receives this packet over that p-port from the packet-router. It is possible for the source and destination to be the same module. It is also possible for a packet to be decomposed into multiple "cells" where each cell of the packet has the same source and destination module and same packet type. The multiple cells are combined into a packet at the destination.

A "transaction" 300, suggested by the dashed line box in FIG. 3, is an exchange of packets that allows a module to access the state of another module using the super highway bus 202. A transaction comprises a transfer of a request packet 301 from a requesting module 307 (also called an "initiator") to a responding module 309 (also called a "target"), followed by a response packet 303 from that responding module 309 back to the requesting module 307. The request packet 301 initiates the transaction and its contents determine the access to be made. The response packet 303 completes the transaction and its contents indicate the result of the access. A response packet 303 may also indicate whether the request was valid or not. The response packet 303 can be formatted as an ordinary response if the request was valid or an error response if the request was invalid.

In the preferred implementation there is a 1:1 correspondence between request and response packets. The transaction protocol in the preferred implementation is "split phase" because the request packet 301 and response packet 303 are a synchronous with respect to each other. A DMA transfer may require multiple transactions and using the split phase feature these transactions need not be conducted synchronously. Requests can be pipelined in that a requesting module 307 can generate multiple request packets 301 before any response packets 303 are received so as to overlap latencies associated with transactions.

Responding 309 modules process requests in the order received, and do not generate a response packet 303 until the requested action is committed. In this manner, apart from internal latency inside the destination module, the access is completed as viewed by all modules coupled to bus 202 when a request packet 301 is received. Any subsequently received requests to that target module will act after that access. This guarantees that time-ordering of access at a destination can be imposed by waiting for the corresponding response.

Packet types of particular importance to the present invention include a memory transaction types associated with writing data to and reading data from memory addresses. Each module comprises memory mapped source and destination registers. These registers own a specific range of addresses within the system memory address space. Accordingly, any memory access operation (read or write) targeted at an address owned by the module is effectively an access to the source/destination registers of the associated module.

In the particular implementation, DMAC controller 209 occupies a single 16 Mbyte block of the physical memory address space. The particular amount of memory space occupied as well as the size of a single memory block are implementation dependent features selected to meet the needs of a particular application. In the specific examples herein, DMAC 209 supports four independent DMA channels. Each channel is defined by values set in five registers that are specific to each channel. In addition, DMAC 209 comprises two "global" registers that affect all of the defined DMA channels. More or fewer channels may be defined to meet the needs of a particular application. The 16 Mbyte memory block of the specific implementation disclosed herein, for example, provides ample memory space to implement tens of DMA channels.

A DMA channel is characterized by the values stored in the five channel-specific registers. As shown in FIG. 4, these registers include a source address register (DMA.SAR), a destination address register (DMA.DAR), a transfer count register (DMA.COUNT), a channel control register (DMA.CTRL), and a channel status register (DMA.STATUS). The two global registers (DMA.VCR and DMA.CONTROL) shown in FIG. 4 contain values indicating state information and error information generally applicable to all DMA channels defined by a particular implementation.

In accordance with the present invention, a CPU uses conventional memory transactions (e.g., LOAD and STORE) defined for system bus 202 to store information to these channel-specific registers prior to the request of a DMA transfer. Each transaction packet includes an address field corresponding to the assigned physical address space that includes a destination portion and an offset portion. In the particular example, the destination portion is formed by the eight most significant bits and the offset portion is formed by the remaining least significant bits of the 32-bit physical memory address. The offset portion is used to specify the registers corresponding to a particular DMA channel shown in FIG. 4.

Each DMA peripheral such as PCI bridge 207 shown in FIG. 2 is associated with logic to implement a peripheral request interface 215. In the preferred examples, peripheral request interface 215 is provided using "glue logic" that implements a simple interface to handle the peripheral-specific protocol expected by the DMA peripheral(s) and the transaction protocol expected by system bus 202. System bus 202 ordinarily supports a set of transactions for performing memory operations including memory LOAD and STORE transactions. One of the benefits of the present invention is that system bus 202 does not need to support DMA-specific transactions. Moreover, a DMA. peripheral does not need any specific knowledge of DMAC 209 as the limited DMA-specific signaling is handled by peripheral request interface 215 rather than DMAC 209.

In a particular implementation, CPU 201 initiates a plurality of memory transactions and generates a corresponding plurality of transaction request packets for transfer on system bus 202. Each memory transaction request packet contains a destination address indicating the DMAC 209 and an offset portion indicating a particular one of the channel-specific registers. Each memory transaction is accompanied by an corresponding response or acknowledge packet generated by DMAC 209 and addressed to CPU 201 to indicate that the memory transaction is complete.

When the specified channel of DMAC 209 is configured, DMAC 209 generates an enable signal to the source peripheral. The enable signal is directed to the specified source peripheral using the values stored in the DMA.SAR field. In the particular examples herein each DMAC channel operates in either an auto request mode or a peripheral module request mode. The mode selection is made by setting a "resource_select" field in the DMA.CTRL register 901, shown in FIG. 9, for the channel. Transfer requests are usually initiated at either the data transfer source or destination, but they can also be issued by a CPU 201 or peripheral modules that are neither the source nor the destination.

When there is no transfer request signal from an on-chip peripheral module to request a transfer, the auto-request mode allows DMAC 209 to automatically generate a transfer request signal internally. This mode can be used by the CPU to set up memory-to-memory moves. When a transer_enable bit in the DMA.CTRL register for the channel and the master_enable bit in the DMA.COMMON register are set to 1, the transfer begins (provided the transfer_end bit in DMA.STATUS register for the channel and the nmi_flag in the DMA.COMMON ADCS register and the address_align_error bit in DMA.STATUS register for the channel are all 0). request packet contains a destination address indicating the DMAC 209 and an offset portion indicating a particular one of the channel-specific registers. Each memory transaction is accompanied by an corresponding response or acknowledge packet generated by DMAC 209 and addressed to CPU 201 to indicate that the memory transaction is complete.

When the specified channel of DMAC 209 is configured, DMAC 209 generates an enable signal to the source peripheral. The enable signal is directed to the specified source peripheral using the values stored in the DMA.SAR field. In the particular examples herein each DMAC channel operates in either an auto request mode or a peripheral module request mode. The mode selection is made by setting a "resource_select" field in the DMA.CTRL register 901, shown in FIG. 9, for the channel. Transfer requests are usually initiated at either the data transfer source or destination, but they can also be issued by a CPU 201 or peripheral modules that are neither the source nor the destination.

When there is no transfer request signal from an on-chip peripheral module to request a transfer, the auto-request mode allows DMAC 209 to automatically generate a transfer request signal internally. This mode can be used by the CPU to set up memory-to-memory moves. When a transer_enable bit in the DMA.CTRL register for the channel and the master_enable bit in the DMA.COMMON register are set to 1, the transfer begins (provided the transfer_end bit in DMA.STATUS register for the channel and the nmi_flag in the DMA.COMMON ADCS register and the address_align_error bit in DMA.STATUS register for the channel are all 0).

In the peripheral module request mode DMAC 209 supports a transfer to be performed to any peripheral that may be added onto the system. DMAC 209 treats all the peripherals same. DMAC hardware receives transfer requests from any or all of these peripherals and performs the transfer after receiving a transfer request in the form of a request signal. However when the transfer request is set to a particular peripheral, the transfer source/destination should be that peripheral's memory mapped source/destination register respectively.

In the preferred embodiment multiple DMA channels are supported. When DMAC 209 receives simultaneous transfer requests on two or more channels it selects one of the channels according to a predetermined, user controllable priority system. This mode is selected by a "priority" field in the DMA operation register DMA.COMMON 601 shown in FIG. 6.

In a "fixed mode" the relative channel priorities remain fixed. In other words, the channel priorities are set such that each channel, except for the lowest priority channel, has a superior priority to a unique subset of channels and each channel, except the highest priority channel, has an inferior priority to a unique subset of channels. All channels operate in a "steal mode" meaning that a lower priority channel can steal control from the higher priority channel(s) if the higher priority channels are idle. The higher priority channel regains control or loses control depending on the speed at which the serviced unit requests the DMAC.

For example a particular four channel implementation priory is assigned so that channel 0 has higher priority than channel 1. If channel 0 is programmed to service in auto request mode then channel 1 gets control only when transfer on channel 0 is completed. If channel 0 is programmed to service in on chip peripheral request mode control moves to channel 1 if a request interrupt is not issued for channel 0 peripheral at the beginning of the next clock cycle.

Alternatively, channels can be selected in a "round robin mode" In round robin mode, each time the transfer of one transfer unit (i.e., 1, 2, 4, 8, 16 or 32 byte) ends on a given channel, that channel is assigned the lowest priority level. The order of priority in round robin mode immediately after a reset is CH0→CH1→CH2→CH3. In the round robin mode DMAC 209 does not wait for the transaction to be complete but moves on to the other channel once the transfer of one transfer unit is complete. If the channel has a peripheral that does not request the DMAC transfer, control moves on to the next channel that has a request interrupt from the peripheral.

Once the desired transfer conditions have been set DMAC 209 waits for a DMA request signal to be asserted (in peripheral request mode). Each peripheral request interface has a DMA request signal line coupled to the DMAC 209. In the preferred implementation, DMAC 209 supports up to seven modules resulting in seven signal lines to support the DMA request signals. The DMA request signal may be asserted by the module that specified the DMA transfer, another module, or CPU 201. In contrast to prior DMA systems, the single DMA request line from each peripheral to DMAC 209 is essentially the only hardware imposition at a system level. More or fewer DMA modules and DMA request signal lines may be provided to meet the needs of a particular implementation.

DMAC 209 is defined by the registers it implements. The DMA.VCR register 501, shown in FIG. 5, contains the following fields:

perr_flags: this field contains the packet error flags (p-error flags) which report the error status of the interface between this module and the packet-router.

merr_flags: this field contains module specific error flags (m-error flags).

mod_vers: this field is provided to allow software to distinguish different versions of a module. This allows software to take appropriate action if there are differences between module versions.

mod_id: this field is provided to allow software to identify and distinguish different modules.

bot_mb: if this module is associated with one or more data blocks then this value indicates the destination value for the data block with the lowest address. If this module is associated with zero data blocks then this value will be the destination value for the control block of this module.

top_mb: if this module is associated with one or more data blocks then this value indicates the destination value for the data block with the highest address. If this module is associated with zero data blocks then this value will be the destination value for the control block of this module.

If a DMAC module 209 is associated with multiple data blocks, then these data blocks will be contiguous in the address space. This allows ranges of data blocks to be described as the inclusive range from the value of bot_mb to value of top_mb.

Upon receipt of a DMA request signal, DMAC 209 checks to determine if a transfer is enabled. The DMA.COMMON register 601, shown in greater detail in FIG. 6 includes an enable field indicating whether all of the DMA channels are enabled or disabled and the DMA.CTRL field 901 shown in FIG. 9 includes an enable field (transfer.enable in FIG. 9) indicating whether the specific channel is enabled. Other fields in DMA.COMMON 601 include a priority field that specifies the manner and order in which channels are handled when multiple DMA channels are implemented and int.status that indicates the status of interrupts for each implemented DMA channel.

When both the common and channel specific enables are set, DMAC 209 initiates a LOAD transaction with a source peripheral specified by DMA.SAR to request transfer one transfer unit of data. The size of a transfer unit is set by a field in the channel specific DMA.CTRL register in the particular example. The specified source device responds to the LOAD request by accessing the requested data and sending a response packet containing the requested data to DMAC 209.

DMAC 209 stores or buffers the response packet and initiates a STORE transaction request with the destination device specified by the DMA.DAR value. The destination device receives and implements the store request and generates a response or acknowledge packet back to DMAC 209. At this point the DMA transaction is essentially complete.

Once DMAC 209 receives an acknowledge message for the initiated transfer request, the value stored in DMA.COUNT is decremented by one for each transfer unit. A transaction to transfer another transfer unit is initiated in compliance with the channel priority policy in effect. When split phase transactions are supported, DMAC 209 may begin servicing another transaction on another DMA channel rather than initiating the next transaction of the current channel. Transfers continue in this manner until the value of DMA.COUNT reaches zero.

A DMA.STATUS register 801 shown in FIG. 1 includes fields indicating status of the DMA transfer for the associated DMA channel. The transfer.end field indicates whether the DMA transfer for the associated channel is complete. The address.error field indicates whether the destination address for a particular DMA channel is misaligned. Software can read these status fields to determine if a DMA transfer is complete or if an error occurred that interfered the transfer. The present invention is readily extended to include other status fields to meet the needs of a particular application.

FIG. 9 shows an exemplary DMA.CTRL register in accordance with the present invention. A transfer.size field indicates the size of each transfer unit to be conducted by DMAC 209. In a particular example, transfer units are selected from 6 choices varying from one byte to 32 bytes, although the particular transfer unit size, range of transfer unit sizes, and increments between available transfer unit sizes are a matter of choice. The source.increment and destination.increment fields indicate the amount the source or destination addresses are incremented for each transfer unit. The resource.select field indicates which system component will generate the transfer request and in the particular example provides for a selection from among seven peripherals and a selection for auto request (described below). The DMA.CTRL register also contains an interrupt.enable field that controls whether an interrupt is sent after the number of transfers specified in the DMA.Count field is satisfied.

As noted above, the present invention can be implemented with an automatic transfer mode in which the DMA transfer is initiated as soon as the channel specific registers are loaded and both the common and channel specific enable bits are set. An automatic transfer does not require one of the DMA request signal lines to be asserted, although auto request mode must usually be indicated by setting a field value in the DMA.CTRL field.

When the specified number of transfers have been completed the transfer ends normally. DMAC 209 sets a bit in the DMA.CTRL field, called the "DMA.CTRL.interrupt enable bit" to indicate the transfer is complete. DMAC 209 checks to determine if the DMA.CTRL.interrupt.enable bit is set and if set generates an interrupt to the system interrupt controller shown in FIG. 2. If the DMA requesting device requires a peripheral-specific signal (as required in a PCI DMA transfer, for example) that signal is generated by the peripheral request interface, not by DMAC 209.

An address error on a channel can occur during a DMAC transaction in two ways. First, it can be because of a misalignment in the address with the transfer size chosen. Second, it can be because of an error response from the bus, for e.g., when the bus doesn't detect any peripheral that DMAC 209 initiates a request to. In the case of a misalignment DMAC 209 sets a bit DMA.STATUS.address_align_error=1 of the corresponding corrupt channel and stops transfer on this channel. In the case of an error response DMAC 209 sets a bit DMA.VCR.perr_flags.err_rcv="1". In addition to the above in both these cases DMAC 209 does the following:

It suspends the transfers on that channel.

It flips the DMA.CTRL transfer_enable=0 for that channel.

It flags an interrupt DERR (DMAC Error).

The status of the SAR, DAR and COUNT of the corrupt channel are left to their present state.

In this manner software can pin-point the problem channel by checking the control registers of the channels and the software can reprogram the channels to behave properly. Transfers on other channels will progress as programmed.

The status of a pending DMA transaction can be identified by using the interrupt enable which causes DMAC 209 to issue an interrupt when the DMA transfer is complete. Alternatively, the DMA requesting module can wait and initiate a read transaction to read the DMA.STATUS register and check if count is zero. The status can be identified by two cases depending on what the programmer sets on the bit DMA.CTRL.interrupt_enable when DMAC 209 is configured. When DMA.CTRL.interrupt_enable bit is set to 0 the DMA.COUNT for that particular channel can be checked for a zero value for request completion. Upon completion of a transaction the DMAC hardware sets a 1 on the DMA.STATUS.transfer_end field. The DMAC does not interrupt the CPU in this case. When DMA.CTRL.interrupt_enable bit is set to 1. The DMA hardware sends an interrupt to the CPU. Also, when a transaction is completed on a channel it is indicated by a 1 in the field DMA.STATUS.transfer_end. Only one interrupt is generated by DMAC 209 each time a transaction/transactions is completed on the channel/channels.

In this manner the present invention provides DMA instructions that are integrated into the basic transaction set of bus 202. This feature enables any module coupled to bus 202 to implement DMA with minimal hardware overhead. Corresponding logic in DMAC 209 responds to the memory transactions to set up a DMA transfer on behalf of the requesting module. A single DMA request signal initiates a DMA transfer.

The present invention provides a direct memory access system where the DMAC does not need to generate a transfer acknowledge or any other peripheral-specific signals. Glue logic, namely peripheral request interface 215, decodes transaction packets from the system bus 202 and based on the source field generates the peripheral-specific signaling. This ensures that the DMAC does not need any special purpose resources to support any of the peripherals. In turn, the DMAC design can be readily reused in a wide variety of systems with a wide variety of peripherals.

The present invention provides a DMA system that can support multiple channels with interchannel switching specified by two or more priority modes. This feature provides flexible, programmable priority switching between the peripherals connected to the system.

The request interface of DMAC 209 is independent of the peripherals so that any peripheral can support DMAC operation with the help of glue logic that implements a simple handshake between peripherals. The DMAC is defined to be general purpose and can be plugged onto a system that provides a bus interface to the system and a signal line for each DMA peripheral to assert a DMA request signal. The control registers within DMAC 209 do not contain any peripheral specific information making it very scaleable, adaptable, and reusable.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein to perform precise architectural update in an emulated or simulated out-of-order machine. Accordingly, these and other variations are equivalent to the specific implementations and embodiments described herein.

What is claimed is:

1. A computer system comprising a:
   a system bus having a plurality of ports for coupling to system components including memory, central processing unit(s) and peripherals;
   a direct memory access controller (DMAC) is coupled to the system bus, the DMAC comprising a set of registers;
   a CPU coupled to the system bus wherein the CPU is configured to initiate a plurality of transactions with each transaction transferring a value to one of the DMAC registers;
   an enable signal generated by the configured DMAC to a specific peripheral identified in the DMAC registers;
   a request signal to the DMAC asserted by the peripheral using an on-chip request interface; and
   a sequence of DMA data transfers generated by the DMAC using the stored register values.

2. The computer system of claim 1 wherein the set of registers within the DMAC do not contain any peripheral-specific information.

3. The computer system of claim 1 wherein the peripheral request interface does not generate any peripheral-specific DMA transfer signals.

4. The computer system of claim 1 wherein the peripheral request interface generates all peripheral-specific transfer signals required by the associated peripheral by taking into consideration the DMA acknowledge and the contents of the system bus.

5. The computer system of claim 1 wherein the set of registers in the DMAC comprises a first set of general registers and a second set of channel specific registers.

6. The computer system of claim 1 further comprising:
   logic within the DMAC for defining two or more DMA channels; and
   a programmable channel priority system within the DMAC for selecting which of the two or more DMA channels is handled by the DMAC at any given time.

7. The computer system of claim 1 further comprising logic within the DMAC generating a response addressed to the DMA peripheral request interface on the bus mechanism wherein the response acknowledges completion of the DMA operation.

8. The computer system of claim 1 wherein the sequence of DMA transfers comprises:
   a LOAD transaction between the DMAC and a source address;
   a STORE transaction between the DMAC and a destination address.

9. The computer system of claim 1 wherein the system bus implements a transaction set including a memory transaction but not including a transaction specific to direct memory access.

10. The computer system of claim 1 wherein each of the peripherals, the CPU, and main memory are associated with memory mapped addresses.

11. The computer system of claim 1 wherein the set of registers in the DMAC further comprises a status register and a control register holding values specific to a particular DMA channel.

12. The computer system of claim 4 wherein the set of registers in the DMAC comprises a first register holding a value indicating a source address and a second register holding a value indicating a destination address, wherein the source address and destination address correspond to specific ones of the memory mapped addresses.

13. The computer system of claim 6 wherein the programmable channel priority system is configured to switch between the two or more DMA channels in the middle of the sequence of DMA transfers.

14. The computer system of claim 12 wherein the set of registers in the DMAC further comprises a third register holding a value indicating a count of a number of transfer packets included in the sequence of transfers initiated by the DMAC.

* * * * *